(12) United States Patent
Castellanos et al.

(10) Patent No.: US 8,175,852 B2
(45) Date of Patent: May 8, 2012

(54) METHOD OF, AND SYSTEM FOR, PROCESS-DRIVEN ANALYSIS OF OPERATIONS

(75) Inventors: Maria Guadalupe Castellanos, Sunnyvale, CA (US); Ming-Chien Shan, Saratoga, CA (US); Fabio Casati, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1910 days.

(21) Appl. No.: 11/057,328

(22) Filed: Feb. 11, 2005

(65) Prior Publication Data

US 2006/0184564 A1    Aug. 17, 2006

(51) Int. Cl.
  *G06F 7/60*    (2006.01)
(52) U.S. Cl. .......................................... 703/2

(58) Field of Classification Search .............. 703/2, 22; 705/1, 11; 702/179–184
See application file for complete search history.

(56) References Cited

U.S. PATENT DOCUMENTS

| | | | |
|---|---|---|---|
| 4,827,419 A * | 5/1989 | Selby, III ................. 701/200 |
| 6,442,515 B1 * | 8/2002 | Varma et al. .............. 703/22 |
| 2003/0065476 A1 * | 4/2003 | Schmidt et al. ........... 702/179 |

* cited by examiner

*Primary Examiner* — Paul Rodriguez
*Assistant Examiner* — Eunhee Kim

(57) ABSTRACT

A method of process-driven analysis of operations includes defining an abstract process, defining at least one metric over the abstract process using a metric definer and computing metric values using a metric computation engine. The method further includes building an analysis model and a prediction model using an analysis and prediction engine to provide analysis on the computed metric values and optimizing the abstract process based on the computed metric values.

18 Claims, 7 Drawing Sheets

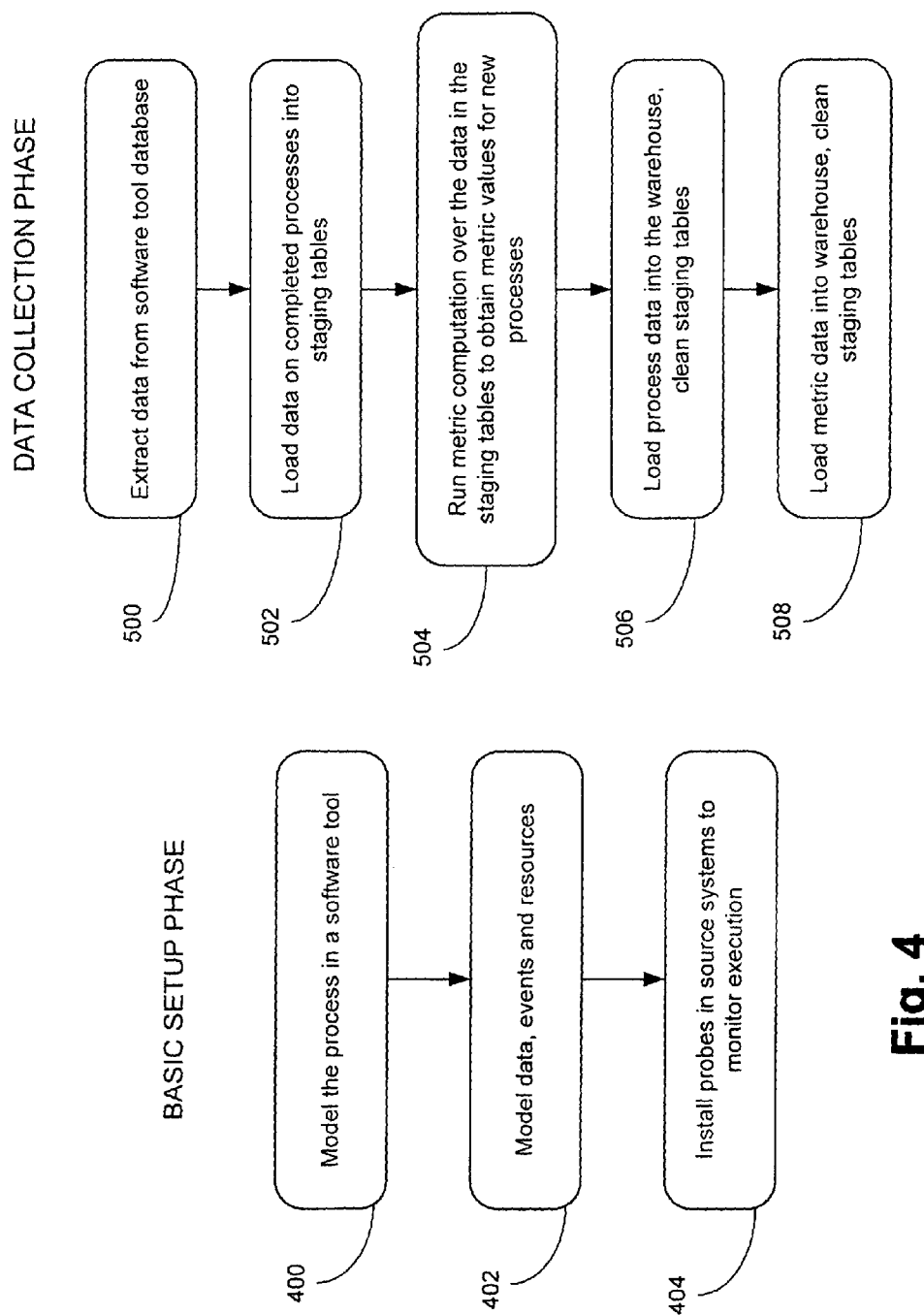

METHOD OF, AND SYSTEM FOR, PROCESS-DRIVEN ANALYSIS OF OPERATIONS

FIELD

The present invention relates, generally, to process-driven analysis of operations and, in particular, to a system for, and a method of, process-driven analysis of operations.

BACKGROUND

The area of business operations monitoring and management is rapidly gaining importance both in industry and in academia. Performance reporting tools essentially leverage system and network monitoring applications, data warehousing and on-line analytical processing applications to perform on-line analysis of business operations. Such analysis results in charts and tables from which users can identify the state of a system and what is happening in that system at a high level and then access further information that provides greater detail of the business operations.

Whilst such systems provide value, there is a large gap between what is presently available and what users wish to access in the area of business operations monitoring and management. Only recently has business level operation analysis become a key component of a company's IT infrastructure and therefore related technologies are still immature.

Business analysts tend to think of the way business operations are performed in terms of high level business processes, termed abstract, as they are abstracted versions of the actual processes being executed by the company's IT infrastructure. At present there is no manner in which an analyst can draw such abstract processes and use them to analyze and report on business operations. Furthermore, defining metrics of interest and reporting against these metrics requires a significant coding effort. Even then, only simple charts plotting historical or present metric values are available.

No system provides the facility for easily defining metrics over process execution data, for providing users with explanations for why a certain metric has a certain value and for predicting the future value of a metric on a process, all of which are required by business analysts. Furthermore there is no automated support for modifying the abstract business processes to improve critical metrics and there is no support for understanding the business impact of system failures.

Prior art solutions to the above have required very intensive manual labor, for example in terms of the effort of programming and coding at each step. A large amount of coding has been required to define metrics, to perform metric analysis, to perform predictions and to simulate and optimize the process. None of these steps has ever been performed together in an automated fashion that has been easy to use at every process. A wide variety of both products and solutions may have been proposed to satisfy one or more of these requirements but none has provided a solution to providing every process in an automated fashion.

SUMMARY

A method of process-driven analysis of operations includes defining an abstract process, defining at least one metric over the abstract process using a metric definer and computing metric values using a metric computation engine. The method further includes building an analysis model and a prediction model using an analysis and prediction engine to provide analysis on the computed metric values and optimizing the abstract process based on the computed metric values.

BRIEF DESCRIPTION OF THE DRAWINGS

FIG. 4 is a flow diagram of a set up phase in which processes are defined according to an embodiment of the invention;

FIG. 5 is a flow diagram showing the loading of data into a data warehouse according to an embodiment of the invention;

DETAILED DESCRIPTION OF THE EXEMPLARY EMBODIMENT

An embodiment includes a business operation management platform. The platform provides the functionality of computing metric values, providing analysis and prediction models, performing intelligent analysis, monitoring and optimization of abstract processes. Furthermore, the platform defines properties of interest on abstract processes, including properties having certain values, predicts future values and optimizes one or a set of processes in order to improve the value of a property. All of this is done in an automated fashion.

The platform provides a comprehensive view of the enterprise and of the business operations performed in it, detects actual or predicted problems at all levels, including critical problems that have a high impact on the overall system. In addition to providing information and alerts, the platform includes control and optimization features so that managers can use the platform to automatically or manually intervene on the enterprise processes and resources, to make changes in response to problems or to identify optimizations that can improve business-relevant metrics.

Figure 1:
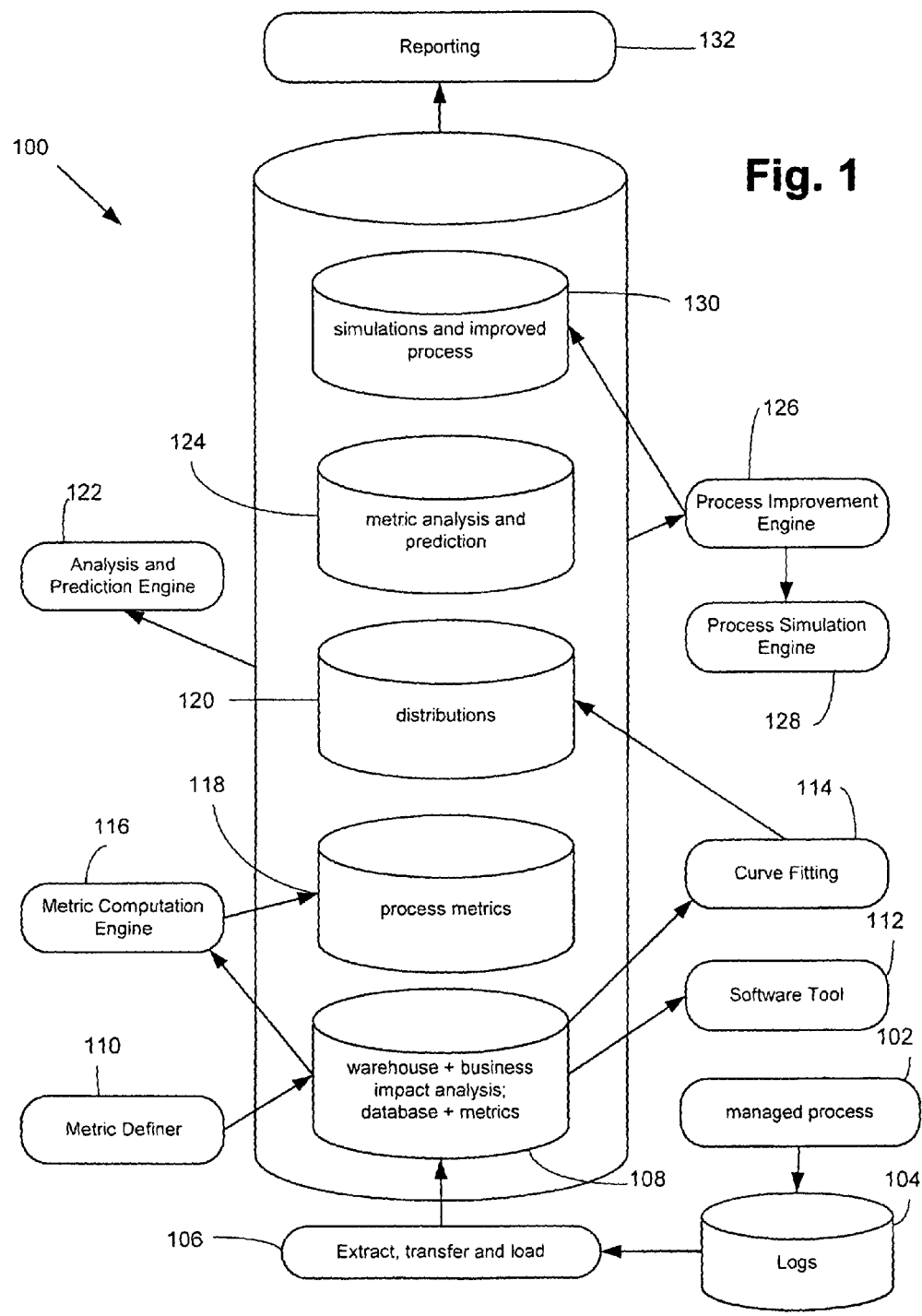
FIG. 1 is a schematic diagram showing the architecture of a business operation management platform according to an embodiment of the invention.

The high level architecture of the platform 100 is depicted in FIG. 1. The platform 100 includes several components, a key part of which is a software tool 112 that allows users to define abstract processes and links the steps in these processes with the events, such as payments, orders, etc that occur in the underlying IT infrastructure. An example of a suitable software tool is the Openview Business Process Insight (OVBPI) owned by the present assignee.

From the managed process 102, logs 104 are made and information from the logs 104 is extracted, transferred and loaded at 106 to module 108 of platform 100. Metrics are defined by metric definer 110 and then processed by metric computation engine 116. Software tool 112 allows a user to define an abstract process using an abstract process definition engine. The platform 100 also computes probability distributions 120 which uses curve fitting applications 114. Metric analysis and prediction module 124 provides analysis on the computed metric values and uses an analysis and prediction engine 122. A process improvement engine or optimization engine 126 optimizes the abstract process based on the computed metric values. The process improvement engine 126 uses a process simulation engine 128. Following the simulations and improved process 130, all data processed by the platform 100 is forwarded to a reporting module 132.

Unlike workflows, abstract processes are not executable and have the only purpose of supporting the monitoring of business operations at a level that is appropriate for business users. The software tool also allows linking of steps in the process with physical resources, such as systems and applications, responsible for the execution of these steps. Thus it becomes possible to understand the business impact of resource failures, that is, understanding which abstract processes are impacted and how. In addition to monitoring abstract processes, the platform leverages other business operations data, managed by means of traditional data warehousing techniques.

Figure 2:
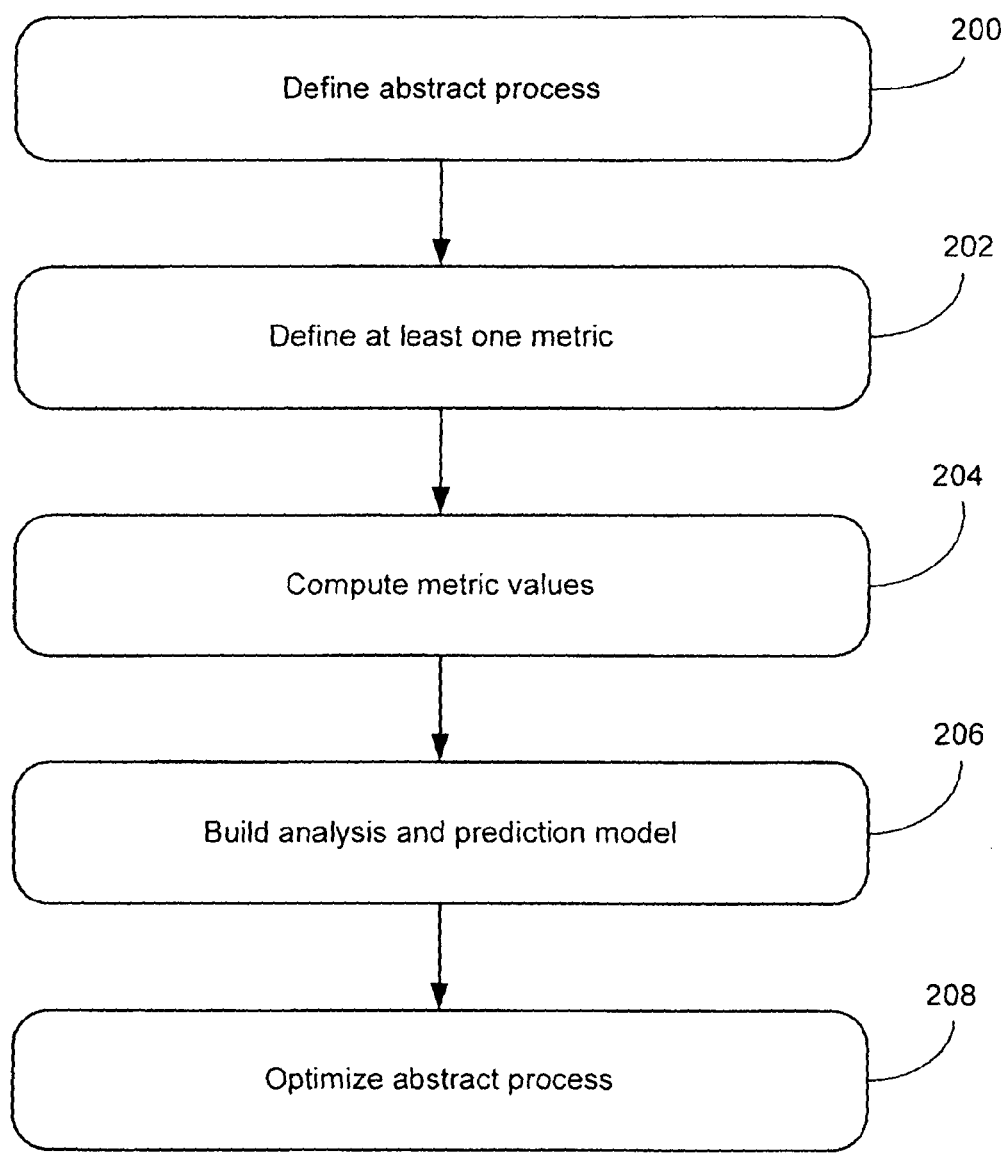
FIG. 2 is a flow diagram showing steps taken in a method of process-driven analysis of operation according to an embodiment of the invention.

Referring to FIG. 2 method steps of a process-driven analysis of operations according to an embodiment are shown. At step 200 an abstract process is defined. At step 202 at least one metric is defined using the metric definer 110. At step 204 the metric values are computed using the metric computation engine 116. At step 206 analysis and prediction models are built using the analysis and prediction engine 122 and at step 208 the abstract process is optimized using process improvement engine 126.

Figure 3:
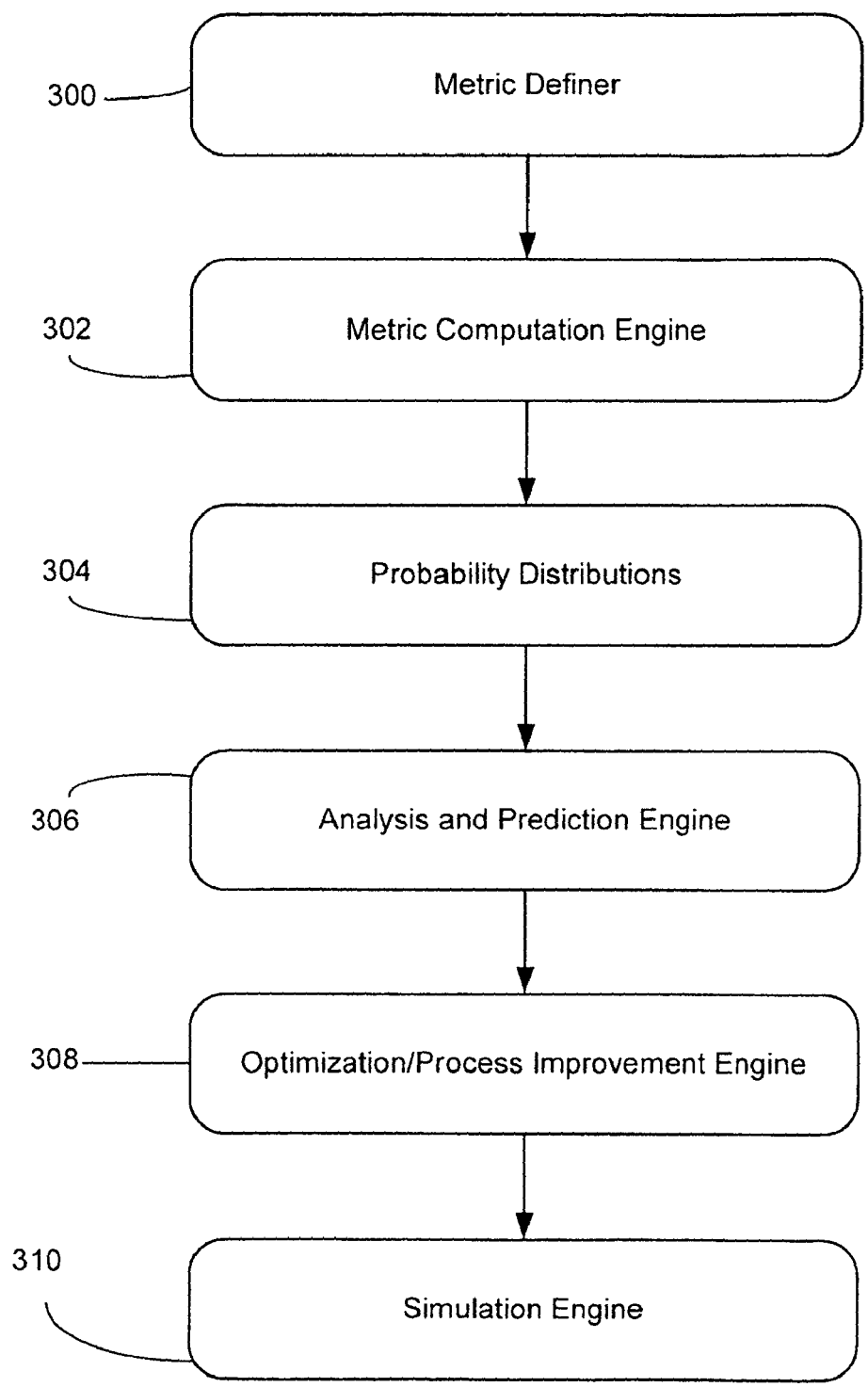
FIG. 3 is a schematic diagram showing the sequence of operation of the components of the platform of FIG. 1 in accordance with an embodiment of the present invention.

Referring to FIG. 3 once the processes have been defined, the platform users can define metrics through a metric or SLA definer 300. SLA is an acronym for Service Level Agreement which is a type of metric. As an example, analysts can define a "success" metric that defines a payment process that is successful if it ends at a "pay invoice" node and is completed within four days from the time the invoice has been received. In an embodiment, metrics are defined by means of a simple web-based graphical user interface. Once these have been defined, a metric computation engine 302 computes metric values. In addition, the platform 100 automatically computes probability distributions 304 for both process attributes and for metrics. Process distributions include the duration of each step and of the whole process and the process arrival rate. The distributions are derived by curve fitting applications which apply curve fitting algorithms to abstract process execution data. For example users can discover that the duration of the "check invoice" step follows a normal distribution with a given mean and variance. Alternatively the process arrival rate may follow a Poisson distribution or determine that the user defined "invoice processing cost" metric has a uniform distribution.

Process data generated by the software tool, warehoused data, metrics, metrics violations, and distributions constitute the basic reporting information of the platform that can be used to analyze process executions as well as to generate alerts. This information can be obtained with minimal modeling effort. In addition to this, the platform provides additional features to help users obtain the best results from this information and understand which processes/steps go awry, why and what is the impact on a business and also how to correct problems. One of these features is "process analysis" which is performed by an analysis and prediction engine 306. This includes providing users with explanations for why metrics have certain values, for example why the cost is high or the success rate is low.

To this end, the platform integrates algorithms that automatically mine the platform databases and extract "decision trees". The decision trees allow users to examine, graphical form, the correlation between metric values and other process attributes or other metrics. As an example, users can see that unsuccessful processes are often characterized by invoices from a certain supplier arriving at a certain day. Another feature of the platform is to provide users with a prediction of the value that a process-specific metric will have at the end of an abstract process, or whether a metric will be violated or not. Predictions are made at the start of a process and are updated as process execution proceeds. In addition to the predicted value, that is, whether the process is successful or what is the process cost, users are provided with an indication of the confidence with which the prediction is made. A particularly useful kind of prediction involves the estimation of the business impact of IT resource failures, that is, the identification of which abstract processes will be affected and in what way when a system's or application's performances are degraded.

Metric analyses and predictions are very useful for users but leave the burden of optimization to the users. The platform in an embodiment includes an optimization/process improvement engine 308 that suggests improvements to the enterprise process based on business goals, expressed in terms of desired metric values defined over abstract processes. This is achieved, by leveraging of process simulation techniques through a simulation engine 310. Users can, through the platform graphical user interface, state that they want to optimize an abstract process so as to minimize or maximize the value of a certain business metric. The platform will then simulate the execution of several alternative process configurations corresponding to that abstract process.

For example, the platform will try to allocate human and automated resources in different ways while meeting resource constraints defined by the user. The platform will compute metrics from the simulated data and will consequently identify the configuration that best meets the user's goals. Since this is a potentially very time-consuming procedure, the platform also optimizes the search among the many possible process configurations. In addition to automated optimization, users can explicitly define and simulate processes and then leverage all of the platform reporting facilities described for analyzing the simulated process, with the same capabilities and the exact same GUI paradigm used for the analysis of actual process executions.

All of the above features of the platform are provided in a fully automated fashion at the click of a mouse and without needing the users to be knowledgeable in such fields as process simulation or data mining. The platform is also independent of specific data mining packages, simulation or reporting tools and can work with virtually all of these tools. The value of the platform is in the platform-specific algorithms as well as in the way these tools are integrated.

The operations performed by the platform are described in further detail firstly with reference to FIG. 4 in which the processes are defined using the software tool. Thus, at step 400 the users model the process flow through a graphical user interface, and at step 402 model the physical resources and events at each step and then model the process data. Once this is done the process moves to step 404 where probes are installed into the IT infrastructure to send messages (events) to the software tool that allows the software tool to monitor each process execution.

Once the process has been modeled and the software tool starts collecting data, the platform periodically takes data out of the software tool and imports the data into a data warehouse. This is done in order to firstly offload the software tool database which is used for monitoring, secondly to store data in a format that is more convenient, for the analysis and thirdly to allow for metric computation which can be performed at warehouse loading time.

The process for loading the data into the data warehouse is shown in FIG. 5. Firstly at step 500 data is extracted from the software tool database and at step 502 the data is loaded on completed processes into staging tables. A staging table is an intermediate table that is used in the loading process to store data that is about to be loaded into the warehouse but needs further processing. At step 504, the metric computation is run over the data in the staging tables in order to obtain metric values for the new processes. At step 506 the process data is loaded into the warehouse and the staging tables are refreshed or cleaned. Finally at step 508 the metric data is loaded into the warehouse and the staging tables are refreshed or cleaned.

Figure 6:
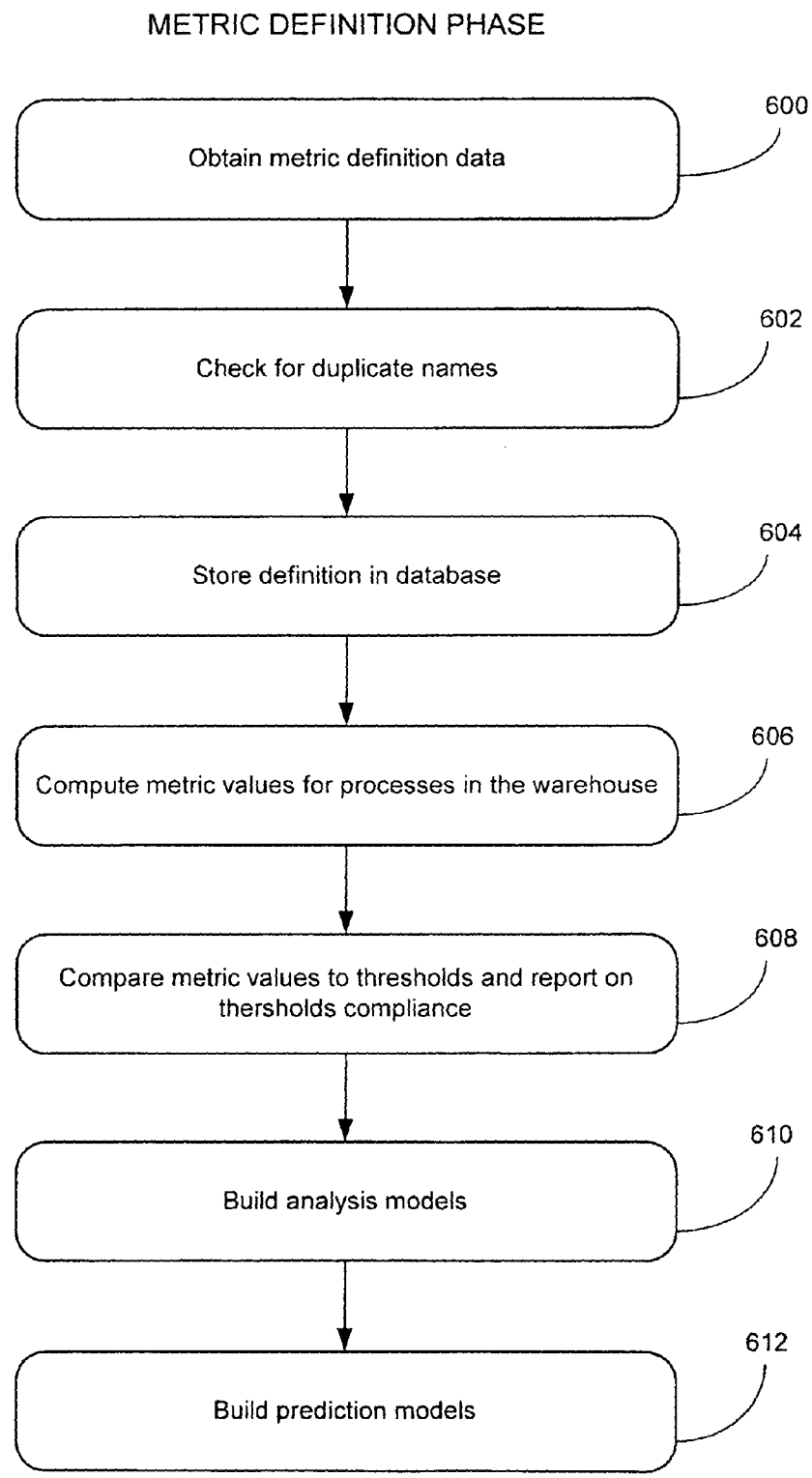
FIG. 6 is a flow diagram of a metric definition phase according to an embodiment of the invention.

Once the process has been defined, the platform allows users to define metrics over the process. In FIG. 6 is shown a flow chart describing this process. At step 600 metrics that have been defined are obtained. In other words, the metric definition data is retrieved. At step 602 a check is made for duplicated names (metric names must be unique) and at step 604 the metric definitions are stored in the software tool databases. At step 606 the metric values are computed for processes in the warehouse via the metric computation engine and at step 608 the metric values are compared to thresholds and a report on thresholds compliance is issued. At step 610 an analysis model is built and at step 612 prediction models are built. It is observed that metric values are computed immediately when a metric is defined. In addition, as per the flow chart in FIG. 5, the platform keeps computing metric values on processes as they are completed. In addition to computing metric values, the platform builds analysis and prediction models as shown in FIG. 6 that can be used to understand why metrics have certain values or to predict future values of metrics for a running process.

Once the metrics have been defined, then the platform can optimize the process based on these metrics. This process is shown in the flow chart in FIG. 7. At step 700 the user selects the metric they wish to optimize after a prompt by the system. This typically means the users either want to minimize the value of a metric, for example minimize the cost, or they wish to minimize the number of cases (process executions) for which the process instance is outside normal parameters. At step 702 the user inserts the constraints on other metrics, possibly defined for different processes. As an example, while users may want to minimize the cost metric for a first process, they still might want the performance metric to be above a certain threshold for a second process.

At step 704 the user after being prompted inserts the resource pool configuration parameters, such as the cost and pool size. Nodes in a process are executed by resources and resources are taken from resource pools. Users in this stage or step enter the size of the resource pools and their variability and cost information. For example, the user can state that resource pool "administrative assistant" could have between five and ten people and that each person costs $50 per hour.

Other resource pools involved in the process have their size entered and the variability and cost information pertaining to those resource pools entered. It is then up to the optimization engine 308 to find out the best size whilst keeping the overall cost low. The best configuration is found by trying out or simulating the process with different sizes for the resource pools at step 706 and by computing metrics from of the simulated data.

The platform 100 does not try all possible configurations but uses simple heuristics to limit the configuration space. For example, if adding a resource to a pool produces good results, then the platform 100 tries adding one more resource otherwise it stops that task. At step 708 the results are evaluated and another configuration selected and at step 710 the process is finished and reported to the user.

It is observed that for simulating a process, many more characteristics are needed apart from resource pools. The platform reads the software tool process definition and automatically converts this into the format supported by the simulator. The platform also undertakes computation of probability distributions related to node durations and a process arrival rate based on past execution data. This information is transferred to the simulator so that it can properly run simulations over software tool processes.

Figure 7:
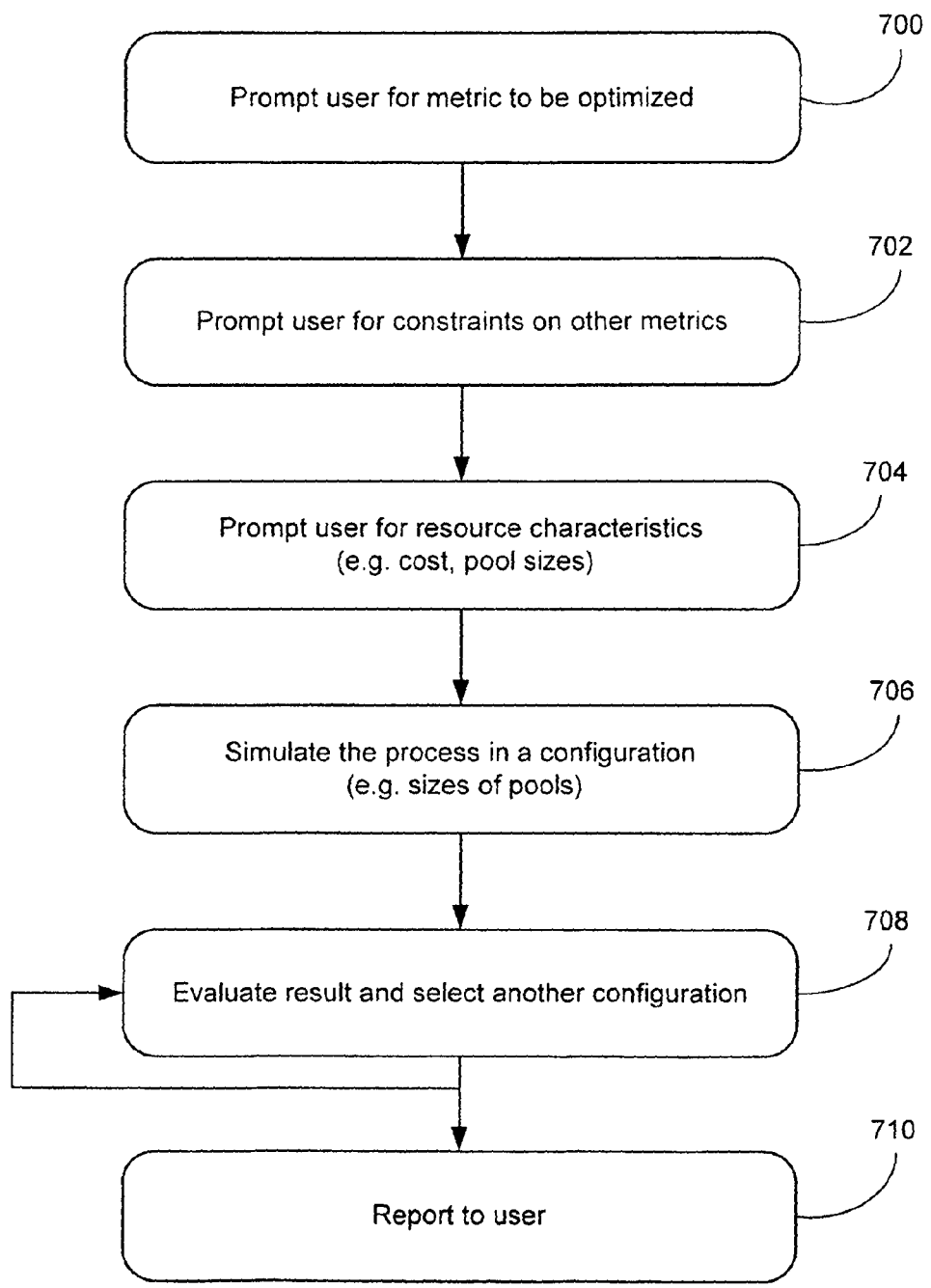
FIG. 7 is a flow diagram of a process optimization phase based on the defined metrics from FIG. 5 in accordance with an embodiment of the present invention.
Figure 8:
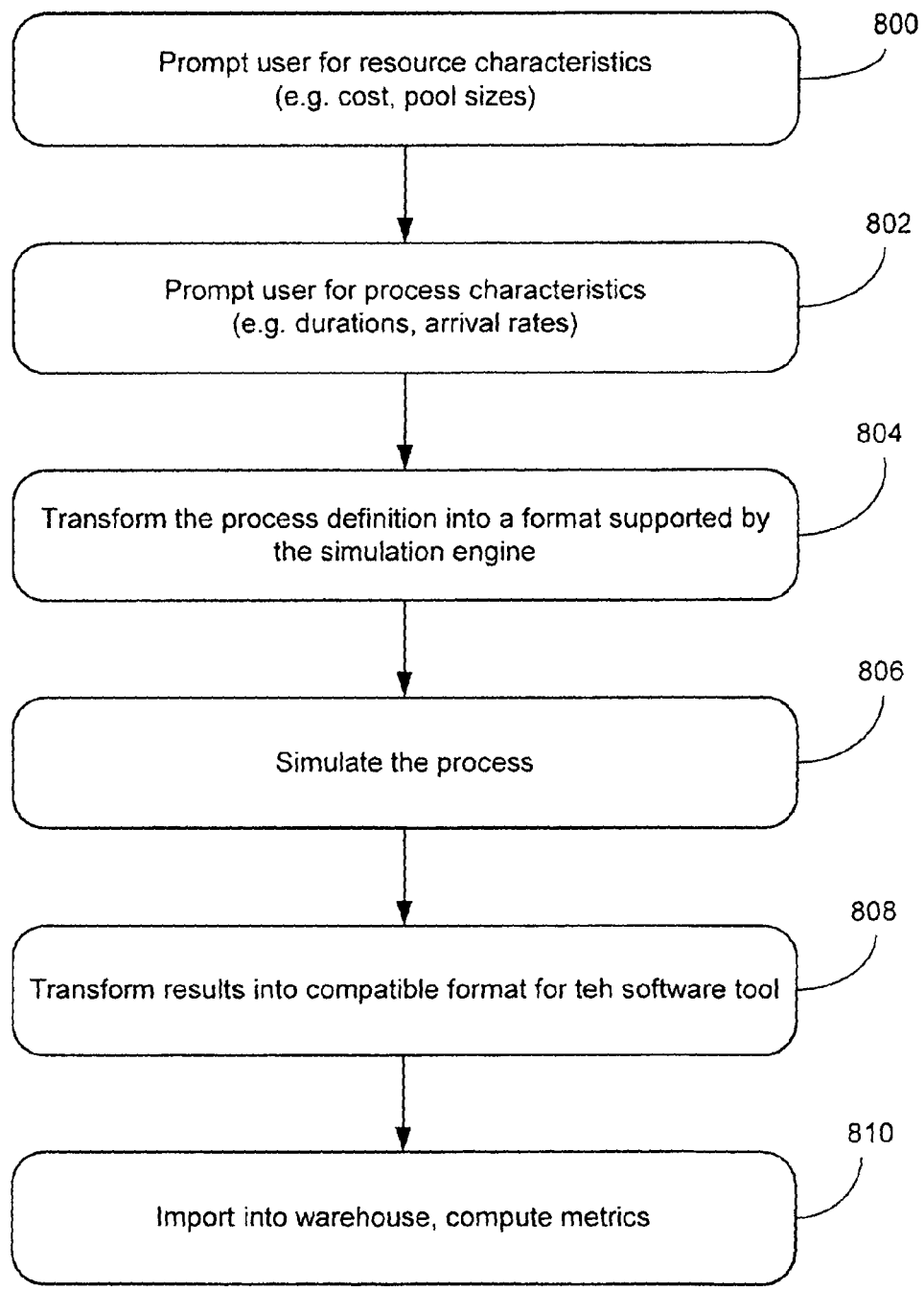
FIG. 8 is a flow diagram of a further process optimization phase according to an embodiment of the invention.

In FIG. 8 there is shown the analysis portion which is similar to the optimization of FIG. 7 with the exception that only one simulation run is made. At step 800 the user is prompted for resource characteristics, such as cost and pool sizes and at step 802 the user is prompted for process characteristics, such as durations and arrival rates. Thus, the user can enter all the simulation parameters including the arrival rates and distributions of no durations if they wish, although default values are provided to the user based on what has been extracted from the data. At step 804 the platform imports the software tool process into the simulator thereby transforming the process definition into a format supported by the simulation engine. At step 806 the process is simulated and run and at step 808 the results are converted back into the format compatible with the software tool. At step 810 the data is imported into the warehouse and the metrics are then computed. In this manner a user can analyze simulated processes in the same way they analyze real processes, including analysis of business metrics.

Varying embodiments of the present invention have particular advantages in performing intelligent analysis, monitoring, and optimizing processes in one procedure. Users can define properties of interest on abstract processes, understand why properties have certain values, predict future values and optimize one or a set of processes in order to improve the value of a property. This is all done in a fully automated fashion without requiring data mining or process simulation expertise on the part of the user.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of process-driven analysis of operations comprising:
   defining an abstract process;
   defining at least one metric over the abstract process using a metric definer; computing metric values using a metric computation engine;
   building an analysis model and a prediction model using an analysis and prediction engine to provide analysis on the computed metric values;
   calculating probability distributions of attributes of the process and of computed metric values; and
   optimizing the abstract process based on the computed metric values.

2. The method as claimed in claim 1 wherein the analysis of operations pertains to a business's information technology infrastructure and the step of defining an abstract process includes modeling process flow through a graphical user interface, modeling physical resources and modeling, process data.

3. The method as claimed in claim 2 further comprising installing probes in the information technology infrastructure to send messages pertaining to the monitoring of process executions.

4. The method as claimed in claim 3 wherein after modeling process flow, physical resources and process data, the method further comprises:
collecting data on processes from a database;
loading the data on completed processes into a data warehouse for further analysis and metric computation.

5. The method as claimed in claim 4 wherein the step of defining at least one metric includes:
obtaining metric definition data;
checking for duplicate names;
storing the definition data in the database;
computing metric values on data on completed processes stored in the data warehouse;
computing metric values to thresholds and reporting on threshold compliance;
building the analysis model; and
building the prediction model.

6. The method as claimed in claim 1 wherein the optimizing step comprises:
selecting a metric to be optimized;
applying constraints on other metrics;
inserting one or more configuration parameters of resource pools, including a resource pool size;
simulating the process using different sizes of resource pools; and
computing metric values from the simulation data.

7. The method as claimed in claim 1 wherein the distribution calculation uses curve fitting applications.

8. A system for process-driven analysis of operations comprising a platform having:
an abstract process definition engine that allows a user to define an abstract process;
a metric definer to enable a user to define one or more metrics over the abstract process;
a metric computation engine for computing metric values of the one or more metrics;
an analysis and prediction engine to provide analysis on the computed metric values; and
an optimization engine for optimizing the abstract process based on the computed metric values, wherein the platform calculates probability distributions of attributes of the process and of the computed metric values,
wherein the platform analyzes operations pertaining to a business's information technology infrastructure and the abstract process definition engine models process flow through a graphical user interface, models physical resources and models process data, and
wherein probes are installed in the information technology infrastructure to send messages pertaining to the monitoring of process executions.

9. The system as claimed in claim 8 wherein after modeling process flow, physical resources and process data, the platform further:
collects data on processes from a database;
loads the data on completed processes into a data warehouse for further analysis and metric computation.

10. The system as claimed in claim 9 wherein the metric definer;
obtains metric definition data;
checks for duplicate names; and
stores the definition data in the database.

11. The system as claimed in claim 10 wherein the metric computation engine computes metric values on data on completed processes stored in the data warehouse and computes metric values to thresholds and reports on threshold compliance.

12. The system as claimed in claim 11 wherein the analysis and prediction engine builds the analysis model and builds the prediction model.

13. A method, comprising:
defining an abstract process;
defining at least one metric over the abstract process;
computing metric values using a metric computation engine;
building an analysis model and a prediction model using an analysis and prediction engine to provide analysis on the computed metric values;
calculating probability distributions of attributes of the process and of the computed metric values; and
optimizing the abstract process based on the computed metric values.

14. The method of claim 13 wherein the defining of the abstract process includes modeling process flow through a graphical user interface, modeling physical resources and modeling process data.

15. The method of claim 14 wherein after modeling process flow, physical resources and process data, the method further comprising:
collecting data on processes from a database; and
loading the data on completed, processes into a data warehouse for further analysis and metric computation.

16. The method of claim 15 wherein as part of defining at least metric over the abstract process, the method further comprises:
obtaining metric definition data;
checking for duplicate names;
storing the definition data in the database;
computing metric values on data on completed processes stored in the data, warehouse;
computing metric values to thresholds and reporting on threshold, compliance;
building the analysis model; and
building the prediction model.

17. The method of claim 16 wherein as part of optimizing the abstract process, the method further comprises:
selecting a metric to be optimized;
applying constraints on other metrics;
inserting one or more configuration parameters of resource pools, including a resource pool size;
simulating the process using different sizes of resource pools; and
computing metric values from the simulation data.

18. The method of claim 17 further comprising, using curve fitting applications to calculate the probability distributions of the attributes of the process.

* * * * *

UNITED STATES PATENT AND TRADEMARK OFFICE
CERTIFICATE OF CORRECTION

PATENT NO.        : 8,175,852 B2
APPLICATION NO.   : 11/057328
DATED             : May 8, 2012
INVENTOR(S)       : Maria Guadalupe Castellanos et al.

It is certified that error appears in the above-identified patent and that said Letters Patent is hereby corrected as shown below:

In column 6, line 59, in Claim 1, delete "of" and insert -- of the --, therefor.

In column 6, line 66, in Claim 2, delete "modeling," and insert -- modeling --, therefor.

In column 8, line 34, in Claim 15, delete "completed," and insert -- completed --, therefor.

In column 8, line 43, in Claim 16, delete "data," and insert -- data --, therefor.

In column 8, line 45, in Claim 16, delete "threshold," and insert -- threshold --, therefor.

Signed and Sealed this
Twenty-seventh Day of November, 2012

David J. Kappos
*Director of the United States Patent and Trademark Office*